April 5, 1932.   C. M. FAHNESTOCK   1,852,452
TRUCK
Filed Aug. 21, 1930    3 Sheets-Sheet 1

Inventor
Charles M. Fahnestock, Deceased
by George C. Fahnestock, Admr.

By Murray and Rugelter
Attorneys

April 5, 1932.    C. M. FAHNESTOCK    1,852,452
TRUCK
Filed Aug. 21, 1930    3 Sheets-Sheet 2

Inventor
Charles M. Fahnestock, Deceased
by George C. Fahnestock, Admr.

By Murray and Gugelter
Attorneys

April 5, 1932.  C. M. FAHNESTOCK  1,852,452
TRUCK
Filed Aug. 21, 1930   3 Sheets-Sheet 3

Inventor
Charles M. Fahnestock, Deceased
by George C. Fahnestock, Admr.

By Murray and Zugelter
Attorneys

Patented Apr. 5, 1932

1,852,452

UNITED STATES PATENT OFFICE

CHARLES M. FAHNESTOCK, DECEASED, LATE OF CINCINNATI, OHIO, BY GEORGE C. FAHNESTOCK, ADMINISTRATOR, OF CINCINNATI, OHIO

TRUCK

Application filed August 21, 1930. Serial No. 476,784.

The invention relates to that class of trucks known as elevating trucks, such as are used for moving more or less heavy loads from place to place, usually within a factory area where they are operated wholly or partially by hand. Such trucks usually consist of a suitable structure mounted on wheels and capable of being moved and guided by a handle in the hands of the operator and a part of the structure being capable of elevation above the normal height; the load to be handled being placed upon platforms or skids and the truck being adapted to run under said platforms and lift such load on its normal support for transportation to a desired point, where the truck may be lowered, allowing the load to again rest on its normal support, leaving the truck free to be used again.

This truck presents a number of novel features, being simple in construction, easy of operation, and having all of its various elements open to inspection and readily accessible for lubrication.

This invention is free from multiplicity of parts applying the power in a most direct manner to the lifting part of the structure and thus eliminating undue friction, and when in the elevated position the lifting mechanism is entirely free from stress of the load thereby adding greatly to the life of that mechanism. Means are also provided whereby the steering handle or tongue and lifting mechanism is automatically disengaged, when the load is raised to the proper height and locked by a downward movement of said handle, eliminating necessity of manual operation of locking means, thereby providing an added measure of safety.

Another feature is that the truck is a "side lift truck", making is possible to lift the load from either side.

Figure 4:
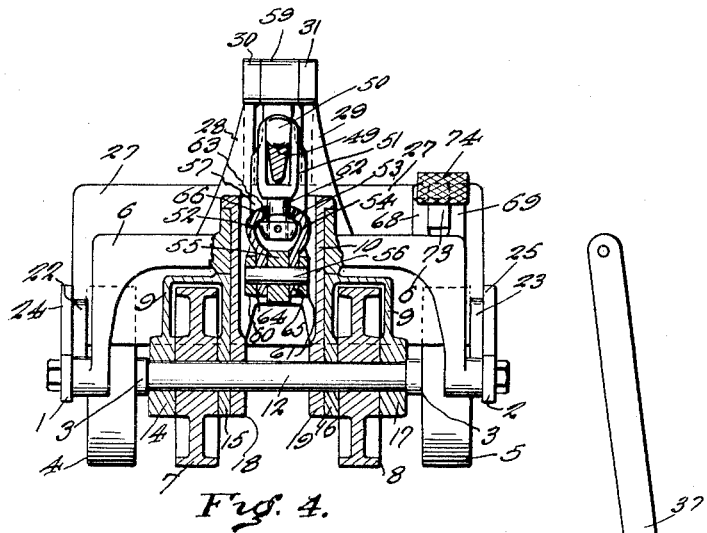
Fig. 4 is a section on line 4—4 of Fig. 3.

As illustrated in the drawings there is provided a lower frame composed of two side bars 1 and 2 supported on the axle 3 of the wheels 4 and 5 at the rear, and connected by the head 6 at the front end.

The steering wheels 7 and 8 are mounted in the yoke 9 which has a central orifice into which the steering post 10 enters. The steering post 10 is journaled in the head 6 and secured to the yoke 9 by the front axle 12 which passes through the bosses 14, 15, 16 and 17, of the yoke 9 and the bosses 18 and 19 of the steering post 10. The head 6 rests on the yoke 9 and thus supports the lower frame.

Upon this lower frame and connected thereto by the rear links 20 and 21 and the front links 22 and 23, there is provided a lifting frame composed of the side bars 24 and 25 connected at the rear by a cross member 26 secured thereto by suitable means and at the front end by a saddle 27 which is also secured to the side bars 24 and 25 in any approved manner. On the saddle 27 and extending upward and forward therefrom, there is provided the arms 28 and 29, having the bosses 30 and 31 at their upper forward extremities, the arms 28 and 29 being substantially midway between the side bars 24 and 25.

There is also provided a projection 32 on the saddle 27 which projection 32 is adapted to be engaged by the locking means when the upper frame is in the raised position.

The steering post 10 journaled in head 6 is provided with a shoulder 33 which bears against the upper side of the head 6 thereby maintaining a fixed relation of the head 6 to the steering mechanism.

Extending upward from the steering post 10 there is provided two arms 34 and 35, and journaled on a pin 36 mounted in these arms 34 and 35 a tongue 37 is provided to guide the truck in motion and to furnish the means through which the force is applied to raise the lifting frame.

A bifurcated hook 38 is mounted on a pin 39 on the tongue 37. The hook 38 has downward extensions 40 and a plate 41 connecting these extensions, forming a foot pedal by means of which the hook may be forced into engagement with the studs 42 and 43 of the lever arms 44 and 45, connected by a hub 46 journaled on a short shaft 47 which has its bearing in the arms 34 and 35 of the steering post 10. A lever arm 48 also connected to the hub 46 is provided with a socket 49 adapted to receive the spherically formed upper end 50 of the link 51.

At the lower closed end of the link 51, is an extension 62 extending through a slotted hole 63 in a clevis 54. A nut or head 52 having a spherically convex surface 53 is secured to this extension 62 in any suitable manner.

The clevis 54 is made up of the side members 64 and 65 which form a bearing for a clevis pin 56 and an upper portion 66 of the clevis 54 has a spherically concave inner surface adapted to coact with the spherically convex surface 53 of the nut or head 52, thus forming in combination with the link 51 a universal tension member connecting the lever 48 and the pin 56.

Between the sides 64 and 65 of the clevis 54 and mounted on the clevis pin 56 is a roller 55 adapted to engage the inner surface 66 of steering post 10. Mounted on the saddle 27 and connected thereto by a saddle pin 58 having bearing in the bosses 30 and 31 of the arms 28 and 29, there is provided a strut 57 having a boss 59 at its upper end which has its bearing on the pin 58.

The strut 57 is provided at its lower end with the lugs 60 and 61 which have their bearing on the clevis pin 56 thus forming a compression member or strut, acting between the clevis pin 56 and the saddle pin 58.

On the head 6 of the lower frame are lugs 68 and 69 which form a bearing for a pin 70 and mounted on the pin 70 is a dog 71 adapted to engage the projection 32 on the saddle 27 for the purpose of locking the upper frame in the raised position when the lifting means is released.

The dog 71 which extends rearwardly from the head 6 is provided with a downward extension 72 which is adapted to engage the rear of the frame 6 and support the dog 71 in a predetermined position, the dog 71 being maintained in this position by gravity.

The dog 71 is also provided with a forward extension 73 and a foot plate 74 by which the dog 71 may be raised from its normal position to release the upper frame from its raised position.

Figure 1:
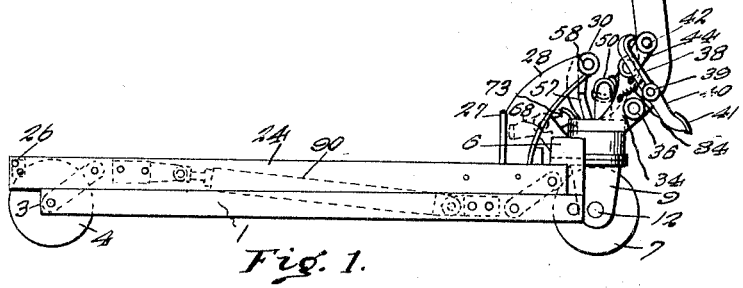
Fig. 1 is a side elevation of a preferred form of the truck in its lowered position.
Figure 2:
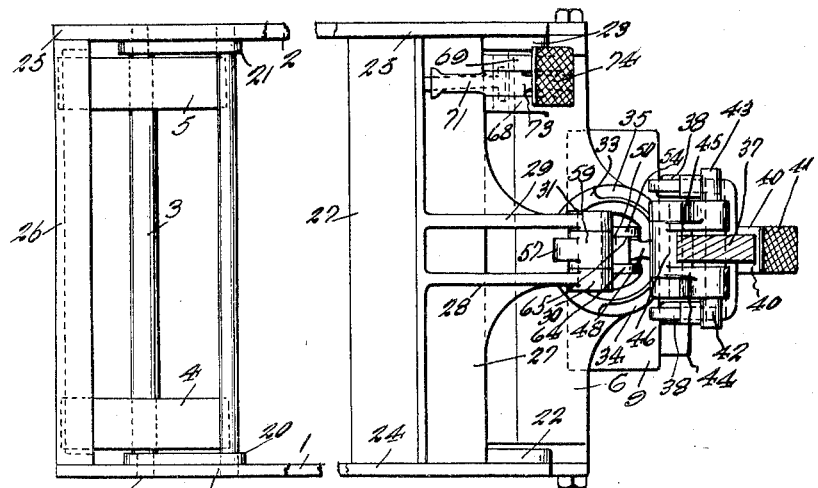
Fig. 2 is a plan view of the truck in its lowered position.

In operation the truck is first placed beneath the load, and the tongue raised to a position as shown in Fig. 1, then by pressure of the foot on the plate 41 the bifurcated hook 38 will be caused to engage the pins 42 and 43 on the lever arms 44 and 45, then by the forward and downward movement of the tongue 37, a downward movement will be imparted to the levers 44 and 45 connected by the hub 46 and fulcrumed on the shaft 47. The lever 48 also attached to the hub 46 will be caused to move in an upward direction, carrying therewith the link 51, the spherically formed end 50 of which has its bearing in the socket 49 of the lever 48. The ball and socket joint thus formed provides for the varying angularity of the link 51 with the reference to the lever 48 throughout the lifting operation.

Through the link 51 and clevis 54 connected thereto by the universal joint this upward motion is imparted to the strut 57. The strut 57 bears on the clevis pin 56 at its lower end and is connected to the forward extension 28 at its upper end. The upper or lifting frame being mounted on links 20, 21, 22 and 23 will be moved upward and backward and the pin 58 mounted in the arms 28 and 29 of the saddle will move similarly upward and backward.

The strut 57 being mounted at its upper end on the saddle pin 58 will move upward and backward at its upper end while the lower end of the strut 57 having bearing on the clevis pin 56 will move in a practically vertical path, the roller 55 mounted on the clevis pin 56 acting to maintain a definite relation to the steering post as well as to maintain a definite relation to the various members of the lifting mechanism.

The strut being thus pulled upward at its lower end will force the upper frame upward and backward to lift it to the predetermined height.

Figure 3:
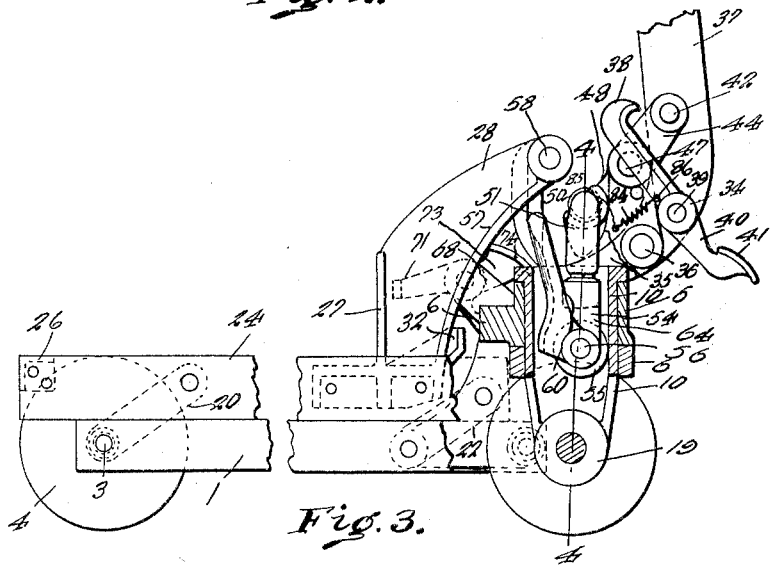
Fig. 3 is a side view of the truck in its lowered position, broken away to show the lifting mechanism, the truck frame broken away in the middle and the handle broken away.
Figure 6:
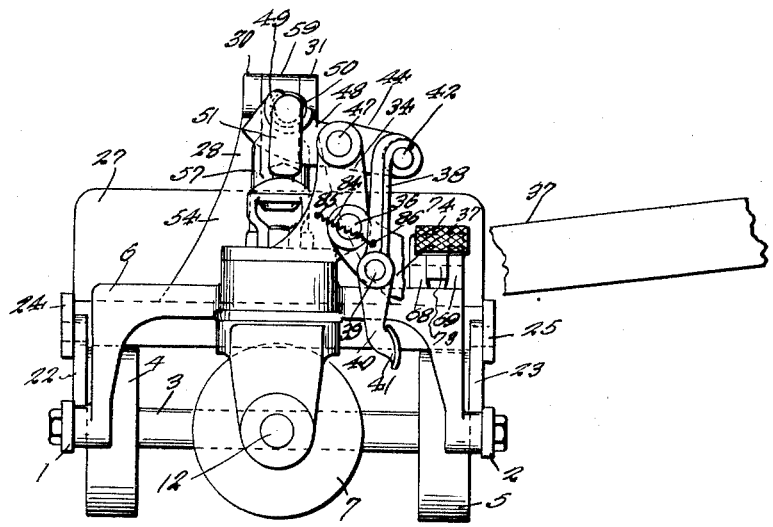
Fig. 6 is a front view showing the truck in raised position with the tongue at right angles to the truck frame, said handle being broken away.
Figure 5:
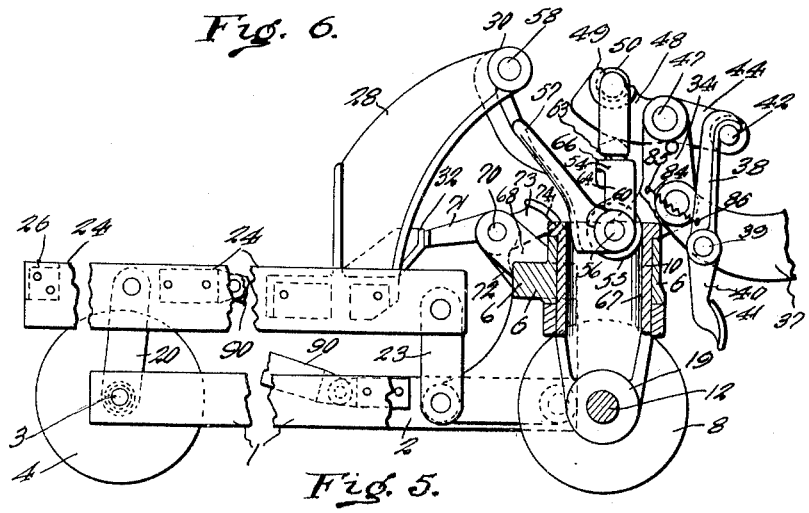
Fig. 5 is a side view of the truck in the raised position and broken away to show the lifting mechanism, the frame broken away in the middle and the handle broken away.

As the upper frame is thus lifted to the elevated position, the projection 32 on the saddle 27, Fig. 3, will move upward and backward, and contacting with the dog 71 will lift the dog 71 from its normal position which is maintained by gravity, the end 71 being heavier than the pedal end 74, and the dog 71 being thus lifted will permit the lug 32 to pass thereunder and the dog 71 will drop into position shown in Fig. 5, abutting the lug 32 thus maintaining the upper frame in its elevated position, and the tongue on being slightly raised will release the hook 38 from its hold on studs 42, when the spring 84 will cause the hook 38 to move backward out of the path of pins 42, leaving the tongue 37 free for the purpose of moving the truck from place to place for guiding same.

In order that the elevating frame may be lowered without a thud, there is employed the usual checking device 90, which may be either a telescopically housed spring or a dash-pot.

It will be understood that modifications and changes can be made in the construction herein specifically set forth without departing from the spirit of the invention, and all such modifications and changes are claimed which fall within the scope of this specification and claims.

What is claimed is:

1. In a truck of the class described, a lower and an upper frame suitably connected together, the upper frame being capable of upward and downward movement in relation to said lower frame, a hollow steering post, a lifting and steering handle connected to said steering post, upward extensions on said steering post, a lever fulcrumed in said upward extensions and operable by said handle, a link, a clevis connected with said link, a strut operating in said steering post and connected to the lever through the link and clevis, a forward extension on the upper frame, the strut coacting with said forward extension, when the handle is lowered, to push the upper frame upwardly and backwardly.

2. In a truck of the class described, a lower frame and an upper frame suitably connected together, the upper frame being capable of upward and downward movement in relation to said lower frame, a hollow steering post and a lifting and steering handle connected to said steering post, upward extensions on said steering post, a lever fulcrumed in said upward extensions, a link, a clevis connected with said link, a strut connected at the lower part of the clevis, said link, clevis and strut operating in said steering post, a forward extension on the upper frame, the strut being connected with said forward extension to push the upper frame upwardly and backwardly when the handle is lowered, means for holding the upper frame in elevated position, and means for releasing the frame so that it can be lowered.

In testimony whereof, I, the administrator of the estate of Charles M. Fahnestock, have affixed my signature at the city of Cincinnati, county of Hamilton and State of Ohio, this 1st day of August, 1930.

GEO. C. FAHNESTOCK,
*Administrator of Chas. M. Fahnestock, Deceased.*